United States Patent [19]

Brookover, Jr.

[11] 3,945,104

[45] Mar. 23, 1976

[54] DIESEL ENGINE CYLINDER LINER PULLER TOOL

[76] Inventor: William S. Brookover, Jr., 965 Washburn St., Clarksburg, W. Va. 26301

[22] Filed: Apr. 25, 1975

[21] Appl. No.: 571,652

[52] U.S. Cl. ........................................ 29/255; 29/282

[51] Int. Cl.$^2$ ........................................ B23P 19/04

[58] Field of Search ............. 29/254, 282, 283, 234, 29/255

[56] References Cited

UNITED STATES PATENTS

| | | | |
|---|---|---|---|
| 2,566,507 | 9/1951 | Walraven et al. | 29/283 |
| 2,586,222 | 2/1952 | Hamilton | 29/283 |
| 3,222,915 | 12/1965 | Swisher | 29/254 |
| 3,805,359 | 4/1974 | Webb | 29/282 |
| 3,875,641 | 4/1975 | Gregg | 29/234 |

*Primary Examiner*—James L. Jones, Jr.
*Attorney, Agent, or Firm*—A. Yates Dowell, Jr.

[57] ABSTRACT

A tool apparatus for removing the cylinder liner from an engine block with or without the assistance of the piston which is slidably mounted within the liner. The apparatus includes a portion which is firmly attached to the cylinder liner from the exterior of the engine block and has an impact member for removing the liner.

3 Claims, 8 Drawing Figures

DIESEL ENGINE CYLINDER LINER PULLER TOOL

BACKGROUND OF THE INVENTION

1. Field of the Invention

This invention relates generally to the removal of piston liners of various kinds and relates particularly to apparatus for removing the piston liners of internal combustion engines.

2. Description of the Prior Art

Heretofore in the construction of internal combustion engines, and particularly in the construction of diesel engines, an engine block has been cast with a plurality of openings or cores in accordance with the number of cylinders and pistons which are to be provided in the engine. Normally each of the cores is machined to snugly receive a cylinder liner or sleeve which has been specially heat treated and in which the inner periphery or bore of the sleeve has been ground and lapped to provide a smooth surface which is engaged by the rings of the piston so that substantial compression can be provided within the cylinder.

The block of most diesel engines includes an air inlet passageway and an air exhaust passageway by means of which air can be introduced into the cylinder during the compression stroke and air can be exhausted from the cylinder at the completion of the power stroke. In order to permit the passage of air into and out of the cylinder, the cylinder liner is provided with a plurality of openings substantially midway of its length which communicate with the inlet and exhaust passageways. This is particularly true of diesel engines produced by Detroit Diesel Company, a subsidiary of General Motors. This company produces a substantial portion of the diesel engines used in motor vehicles, as well as diesel engines used in stationary power plants and the like.

During the active life of a diesel engine the pistons are constantly moving up and down the cylinder and eventually the cylinder liner becomes scored, out of round, or so worn that compression is adversely affected and therefore it becomes necessary to remove the cylinder liner and either replace the liner and the rings of the piston or grind and lap the bore of the cylinder liner and place oversized rings on the piston.

In the past some efforts have been made to provide tools for removing sleeves of various kinds from internal combustion engines, pumps and other structures requiring the cyclic movement of a piston; however, in most of these prior art structures it has been necessary to remove the piston before the mechanism for removing the cylinder could be attached. Due to space limitations, in most cases it has been necessary to remove the crankshaft from the engine before the piston could be removed and therefore it has been necessary to substantially disassemble the entire mechanism in order to remove the cylinder liners. Some examples of the prior art are U.S. Pat. Nos. 1,705,789 to Steirly; 2,503,426 to Tower; 2,568,998 to Fletcher; 2,688,183 to Oberley et al.; 2,924,005 to Wilson et al.; and 3,805,359 to Webb.

SUMMARY OF THE INVENTION

The present invention is embodied in a tool or puller for removing a cylinder liner from a mechanism such as a diesel engine or the like. The tool is firmly attached to the liner from one end only thereof so that it is not necessary to remove the piston and the crankshaft even though the piston may be subsequently removed from the engine block. The tool includes an elongated shank having a head at one end of a size to be inserted into and engaged with the sleeve or cylinder liner, an intermediate clamp plate, a sliding hammer, and an anvil or impact member at the opposite end of the shank. The tool is adapted to be clamped to the cylinder liner so that rotation of the crankshaft to cause movement of the piston drives the cylinder liner partially out of the engine block and thereafter operation of the sliding hammer removes the cylinder liner from the block in such a manner that the piston may remain within such liner.

It is an object of the invention to provide a relatively simple cylinder liner puller tool which can be applied from one end of the liner and operated in such a manner that the liner can be removed from the engine block in a minimum of time and with a minimum of effort.

Another object of the invention is to provide a tool for removing a cylinder liner from an engine block in which rotation of the engine crankshaft assists in removing the cylinder liner.

DESCRIPTION OF THE PREFERRED EMBODIMENT

Figure 1:
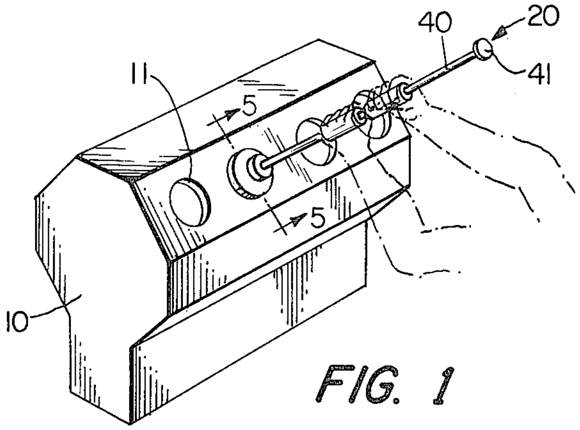
FIG. 1 is a perspective of an engine block illustrating one application of the invention.
Figure 2:
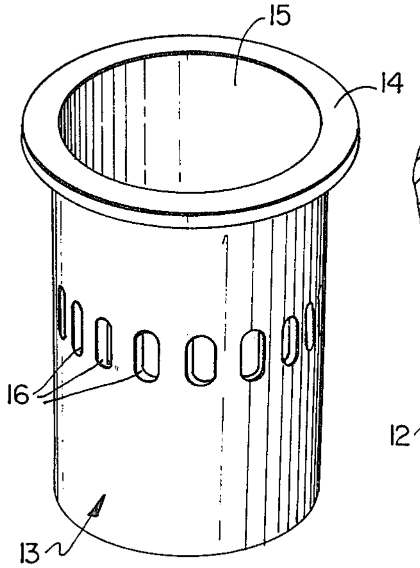
FIG. 2 is a perspective of a cylinder liner per se.
Figure 3:
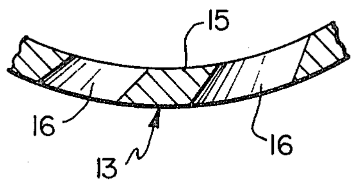
FIG. 3 is an enlarged fragmentary section on the line 3—3 of FIG. 2.

With continued reference to the drawings, a conventional internal combustion engine block 10 has a plurality of cores 11 each of which communicates with one or more air passageways 12 within the block. Each of the cores 11 is provided with a hardened, heat treated cylinder liner or sleeve 13 having an upper flange 14 and a bore or inner peripheral surface 15 which has been ground and lapped to provide a smooth finish. The liner 13 is provided with a plurality of openings 16 substantially midway of its length which are normally aligned with the passageways 12 so that air can be introduced into and discharged from the bore 15. A piston 17 is slidably mounted within the liner and is connected to a piston rod 18 by a pivot 19 or the like. The opposite end of the piston rod has an arcuate recess which receives the crankshaft of the engine and is rotatably connected thereto by a cap or yoke in the usual manner. The structure thus far described is conventional in the art and forms no part of the invention.

In order to remove the cylinder liner 13 when the liner becomes scored, out of round, or for other reasons, a cylinder liner puller tool 20 is provided having a head 21 of a size to be slidably received within the bore 15 of the cylinder liner. Ordinarily the head includes an upper portion 22 and a lower portion 23 connected together in assembled relationship in any desired manner, as by screws or the like (not shown). The lower portion 23 has an elongated recess or channel 24 extending substantially diametrically thereof and terminating in spaced shoulders 25 adjacent to the periphery of the lower portion which define a slot or groove 26 therebetween.

Figure 5:
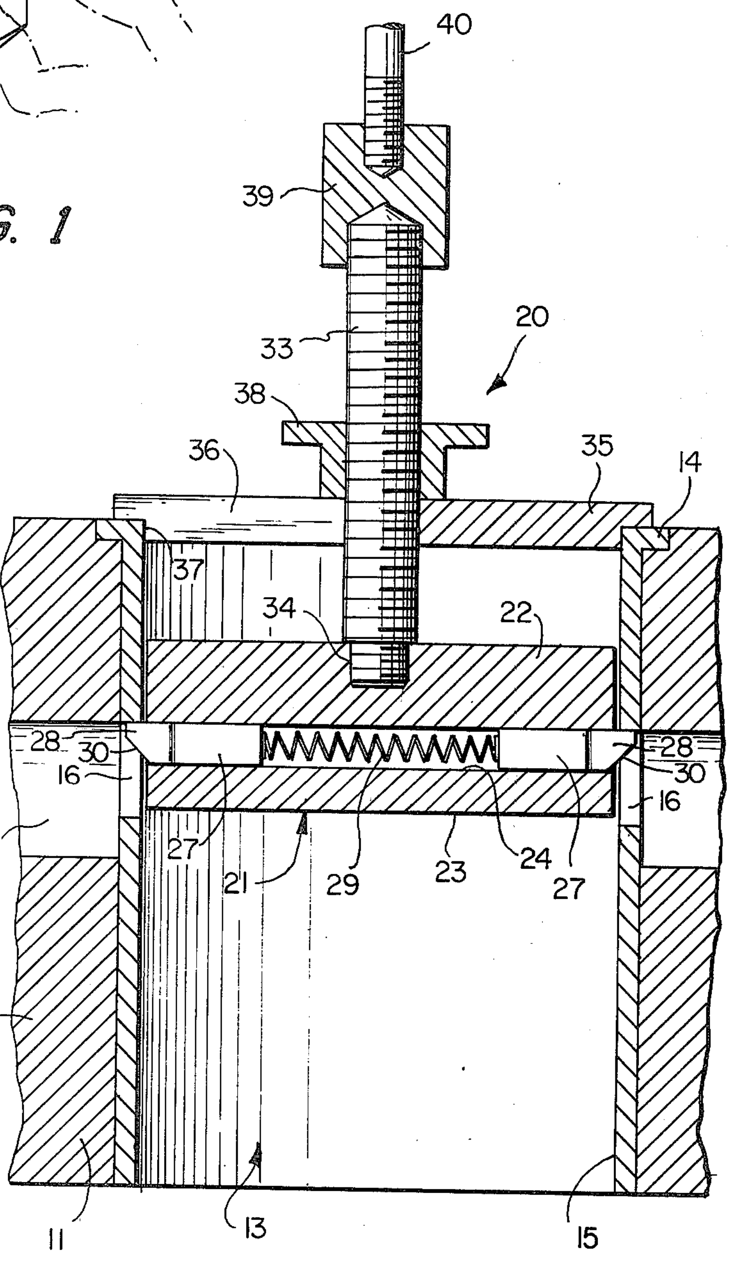
FIG. 5 is a cross-sectional view of the lower portion of the tool in use.
Figure 4:
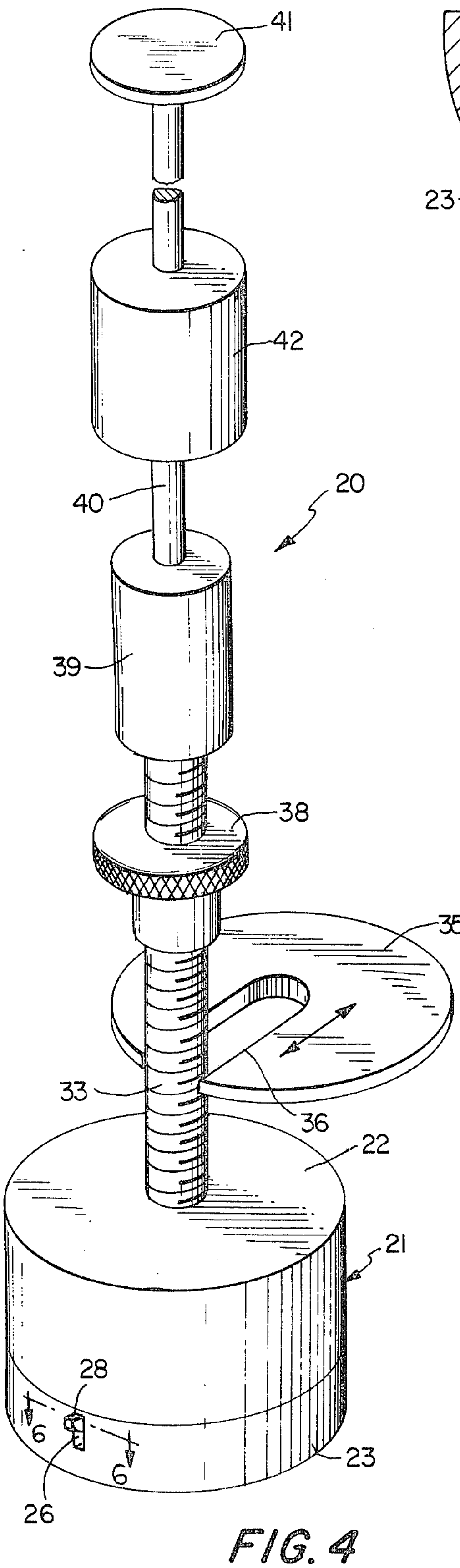
FIG. 4 is a perspective of the liner puller tool of the present invention.
Figure 6:
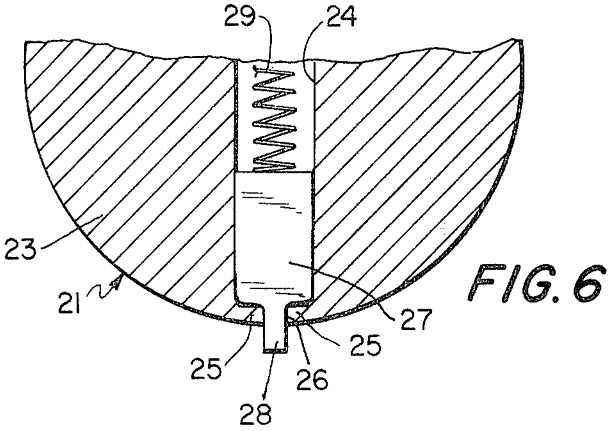
FIG. 6 is an enlarged fragmentary section on the line 6—6 of FIG. 4.
Figure 7:
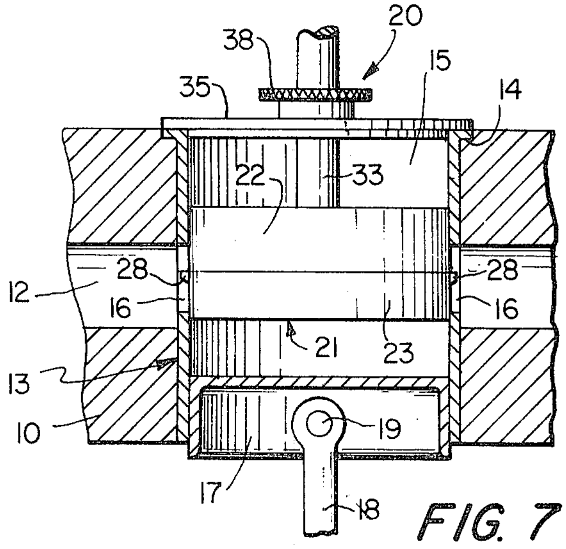
FIG. 7 is a side elevation of the puller tool with portions of the engine block and the cylinder liner in cross-section and illustrating the starting position of the tool.
Figure 8:
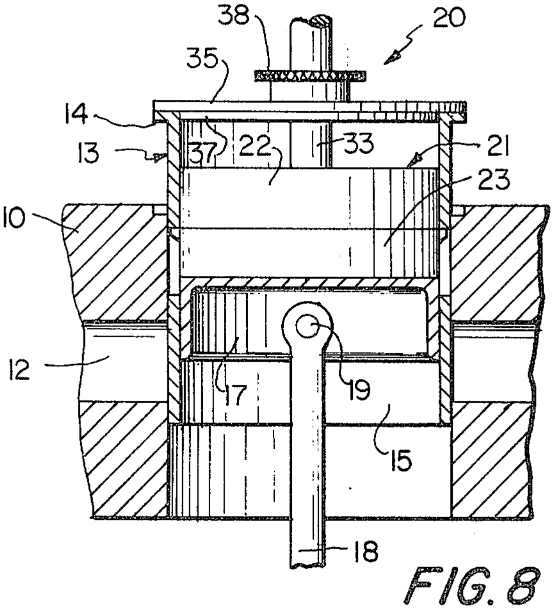
FIG. 8 is a view similar to FIG. 7 with the liner partially removed from the engine block.

A pair of dogs 27 constructed of tool steel or the like having outwardly extending tongues 28 are slidably mounted within the channel 24 and a spring or other resilient member 29 is located between such dogs to urge the dogs outwardly so that the tongues 28 extend through the slots 26 to a position exteriorly of the head 21. As illustrated best in FIG. 5, the lower portion of each of the tongues 28 is provided with a cam surface 30 so that when the head 21 is inserted within the bore 15, the cam surfaces 30 retract the dogs 27 into the channel 24 against the tension of the spring 29 so that the head can move downwardly through the bore. When the tongues 28 are substantially in alignment with a pair of openings 16 in the cylinder liner 13, the spring 29 urges the dogs outwardly into the openings so that the upper portions of the tongues 28 engage the upper walls of the openings 16.

An elongated threaded stud 33 is connected to the upper portion 22 of the head in any desired manner, as by a reduced end 34 threadedly received within the head 21. A clamp plate 35 is freely slidably mounted on the stud 33 either by an enlarged central opening (not shown) or an elongated slot 36 extending inwardly from the periphery of the plate to a position to receive the stud 33. If desired the clamp plate 35 may have a reduced lower portion or step 37 of a size to be received within the bore 15. A nut 38 is threadedly mounted on the stud 33 and is adapted to apply a downward pressure on the clamp plate 35 and an upward pressure on the head 21 so that the clamp plate 35 firmly engages the flange 14 of the cylinder liner and the upper portions of the tongues 28 firmly engage the upper walls of the openings 16.

The upper end of the stud 33 receives and is fixed to one end of a reducing nut or connector 39 and the opposite end of such connector is attached to an elongated shank or rod 40 in any desired manner, as by screw threads, welding, brazing or the like. An anvil or impact receiving member 41 is mounted at the opposite end of the shank 40 and a sliding hammer 42 is slidably mounted on the shank between the anvil 41 and the connector 39.

In the operation of the device, when the cylinder liner 13 becomes unserviceable and must be removed from the engine block 10, the oil pan or lower covering of the engine is removed and the crankshaft is rotated to fully retract the piston 17 within the liner which is to be removed, after which the cap or yoke may be removed from the lower end of the piston rod 18. Likewise the head or top of the engine is removed from the block 10 to expose the upper ends of the cylinder liners 13. The head 21 of the tool 20 is aligned with the cylinder liner having the retracted piston and a downward force is applied to the shank or rod 40 so that the cam surfaces 30 of the dogs 27 cause the dogs to be retracted into the channel 24 and permit the head 21 to enter the bore 15 of the liner. The head is moved downwardly until the tongues 28 are aligned with the openings 16 at which point the spring 29 urges the dogs outwardly into the openings 16. The clamp plate 35 is moved into engagement with the flange 14 at the upper end of the cylinder liner and the nut 38 is tightened to apply a downward pressure against the clamp plate 35 and an upward pressure on the tongues 28 of the dogs 27 to rigidly clamp the tool onto the cylinder liner 15.

When the tool has been mounted on the liner, a lever is connected to the crankshaft and is operated to rotate such crankshaft which causes the piston 17 to rise within the cylinder liner until the top of the piston engages the lower portion 23 of the tool head 21. Continued rotation of the crankshaft in the same direction causes the piston to continue to rise; however, since the tool head is clamped to the liner, continued upward movement of the piston forces the liner upwardly partially out of the engine block 10. When the piston reaches the top dead center position, continued rotation of the crankshaft disengages the crankshaft from the lower end of the piston rod and normally leaves the piston within the liner.

Thereafter a mechanic grasps the sliding hammer 42 and moves the hammer rapidly upwardly along the shank 40 to impart a sharp impact blow to the anvil 41 at the upper end of the shank. The sharp impact blow causes the cylinder liner to be further removed from the engine block. This operation continues until the cylinder liner and the piston therein are entirely removed from the engine block. Thereafter a new cylinder liner may be pressed into the engine block and a piston with conventional rings may be mounted within the liner and connected to the crankshaft.

Alternatively, the bore 15 of the liner which has been removed may be ground and lapped to remove score lines and scratches, and oversize rings placed on the piston so that the original liner and piston may be returned to the engine block.

I claim:

1. A tool for removing a sleeve from a mounting structure in which the sleeve has an elongated bore and a plurality of openings along the length thereof, said tool comprising an elongated shank with a head at one end and an anvil at the opposite end, said head being of a size to be slidably received within the bore of said sleeve, movable means carried by said head and engageable with the openings in said sleeve, clamp plate means movably mounted on said shank in spaced relationship to said head, means for securing said plate means to said sleeve for clamping said tool thereto, and impact imparting means slidably mounted on said shank intermediate said anvil and said clamp means, whereby movement of said impact imparting means against said anvil causes an outward force to be applied to said sleeve to remove the same from the structure in which it is mounted.

2. The structure of claim 1 in which said movable means includes a pair of dogs slidably mounted within said head, and resilient means for urging at least portions of said dogs outwardly from opposite sides of said head.

3. A tool for removing a cylinder liner from an engine block having a piston slidably mounted within the liner, the liner having an elongated bore and a plurality of openings along the length thereof, said tool comprising a head of a size to be received within the bore of said liner, at least one dog means slidably mounted within said head and having resilient means normally urging said dog means outwardly into the openings of said liner, a portion of said dog means normally located exteriorly of said head but being retractable therein, an elongated shank connected to said head, clamp plate means movably mounted on said shank in spaced relationship to said head and selectively engageable with said liner, a nut threadedly engaging said shank and adapted to engage said clamp plate means to firmly attach said head and said clamp plate means to said cylinder liner, a sliding hammer movably mounted on said shank, and an anvil fixed to the end of said shank remote from said head in a position to be engaged by said hammer, whereby when said tool is attached to said cylinder liner the piston engages said head to raise said cylinder liner partially from the engine block and movement of said hammer against said anvil completes the removal of the liner from the block.

* * * * *